US006243006B1

(12) United States Patent
Rejc et al.

(10) Patent No.: US 6,243,006 B1
(45) **Date of Patent: *Jun. 5, 2001**

(54) SAFETY DEVICE FOR MOTOR-OPERATED SYSTEMS

(75) Inventors: Gabrijel Rejc, Landshut; Karl Eichstetter, Tiefenbach, both of (DE)

(73) Assignee: EFAFLEX Tor und Sicherheitssysteme GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/148,312

(22) Filed: Sep. 4, 1998

(30) Foreign Application Priority Data

Sep. 9, 1997 (DE) ..................... 197 39 544

(51) Int. Cl.$^{7}$ ..................... B60Q 1/00

(52) U.S. Cl. ..................... 340/436; 340/686.1; 340/545.1; 340/545.3; 160/1; 160/133; 49/27; 49/28; 250/221; 250/222.1; 250/227.21; 318/264; 318/280; 318/466

(58) Field of Search ..................... 340/436, 686.1, 340/686.2, 545.1, 545.2, 545.3, 555, 556, 557; 160/1, 133, 310; 49/25, 28, 27; 250/222.1, 227.21, 221; 318/280, 466, 256, 264

(56) References Cited

U.S. PATENT DOCUMENTS 4,166,369 9/1979 Nakajima .
4,621,452 * 11/1986 Deeg ..................... 49/28
4,750,592 * 6/1988 Watt ..................... 187/134

(List continued on next page.)

FOREIGN PATENT DOCUMENTS 34 16 546 11/1985 (DE) .
36 03 940 A1 2/1986 (DE) .
86 03 304 8/1986 (DE) .

(List continued on next page.)

OTHER PUBLICATIONS

Patent Abstract of Japan; Inventor: Masaji et al; Publication No. 09189183; Jul. 1997.

U.S. application No. 09/148,311, Rejc et al., filed Sep. 4, 1998.

*Primary Examiner*—Nina Tong
(74) *Attorney, Agent, or Firm*—Nixon & Vanderhye PC

(57) ABSTRACT

A safety device for externally driven systems for protecting the movement of a system component against undesired collision with an object lying in the movement path of the system component is described, the system component to be monitored being capable of being moved in a guided fashion along a predetermined path (door plane ET). The movement path of a leading edge of a system component is preferably monitored by an optical beam protection, preferably on the basis of infrared beams, which protection has at least two, preferably at least three or a plurality of preferably parallel beams which are arranged staggered in the direction of movement of the system component and which are emitted on one side of the system component and received or reflected on the other side. The safety device has a safety circuit with which the movement of the system component is stopped or reversed if an obstacle is sensed in the movement path of the system component. The beam protection is arranged in such a way that the beam area (E) defined by the beams has at least one line in common with the movement area through which the leading edge passes, and in that the autonomously operating safety device has a beam-state control device which assigns different activation states (X, ZERO, 1) to the beams as a function of the position and of the movement of the system component.

11 Claims, 8 Drawing Sheets

U.S. PATENT DOCUMENTS

| | | | | |
|---|---|---|---|---|
| 4,794,248 | * | 12/1988 | Gray | 250/221 |
| 4,818,866 | | 4/1989 | Weber . | |
| 4,853,531 | * | 8/1989 | Rejc | 250/221 |
| 4,953,608 | * | 9/1990 | Larsson | 160/1 |
| 4,967,083 | * | 10/1990 | Kornbrekke et al. | 250/341 |
| 5,142,152 | * | 8/1992 | Boiucaner | 250/341 |
| 5,233,185 | * | 8/1993 | Whitaker | 250/222.1 |
| 5,286,967 | | 2/1994 | Bates . | |
| 5,581,944 | * | 12/1996 | Kornbrekke et al. | 49/28 |
| 5,601,134 | * | 2/1997 | Pinkalla et al. | 160/271 |
| 5,602,526 | * | 2/1997 | Read | 340/457 |
| 5,712,546 | * | 1/1998 | Holthouse et al. | 318/282 |
| 5,823,302 | * | 10/1998 | Tsutsumi et al. | 340/540 |
| 5,886,307 | * | 3/1999 | Full et al. | 197/317 |
| 5,894,267 | * | 4/1999 | Blair | 340/545 |
| 5,969,637 | | 10/1999 | Doppett . | |

FOREIGN PATENT DOCUMENTS

| | | | |
|---|---|---|---|
| 86 15 042 | | 9/1986 | (DE) . |
| 37 90 010 C2 | | 1/1987 | (DE) . |
| 37 09 592 A1 | | 3/1987 | (DE) . |
| 36 18 766 A1 | | 12/1987 | (DE) . |
| 42 05 251 A1 | | 2/1992 | (DE) . |
| 43 34 785 | | 5/1994 | (DE) . |
| 43 34 785 A1 | | 5/1994 | (DE) . |
| 44 24 537 A1 | | 7/1994 | (DE) . |
| 297 07 448 U1 | | 4/1997 | (DE) . |
| 196 01 660 A1 | | 7/1997 | (DE) . |
| 196 04 900 A1 | | 8/1997 | (DE) . |
| 0 284 066 | | 9/1988 | (EP) . |
| 0 325 602 | | 1/1992 | (EP) . |
| 0 676 524 A1 | | 3/1994 | (EP) . |
| 699619 | * | 3/1996 | (EP) . |
| 2685496 | * | 6/1993 | (FR) . |
| 09 189 183 | | 1/1996 | (JP) . |

* cited by examiner

SAFETY DEVICE FOR MOTOR-OPERATED SYSTEMS

BACKGROUND OF THE INVENTION

1. Field of the Invention

The present invention relates generally to a safety device for motor-operated systems such as, for example, segmented doors or rolling shutter doors, for protecting the movement of a system component against undesired collision with an object lying in the movement path of the system component. The safety device is used to sense an object located in the movement path of a system component such as, for example, a door, rolling grille, lift away shutter door and the like.

2. Description of the Related Art

Such safety systems are known, for example, from the documents DE-U-8615042 or DE-A-3416546. According to DE-U-8615042, a safety strip, composed of a tube made of elastomeric material, of a termination profile is provided on one side with a lamp and on the other side with a light-sensitive resistance element. If the safety strip strikes an obstacle, the light beam is interrupted, causing a switching pulse which activates the engine brake to be generated.

DE-A-3416546 relates to a safety device for stopping motor-driven objects. In order to bring about improved response of the safety device for stopping motor-driven objects having a photoelectric barrier arrangement, the photoelectric barrier arrangement is composed of a light transmitter and a light receiver which are arranged at the two ends of a profiled rail having a light duct. When an obstacle is struck, the profiled rail composed of an elastically deformable material is squeezed together, causing the cross-section of the light duct to be reduced, so that the light beam is interrupted.

However, in these elastically deformable safety strips, adequate protection against injuries and damage is provided only if their deformation range corresponds to the follow-on travel of the leading edge of the terminating profile from the activation of the switching device up to the point where it is braked to a complete standstill. Owing to the weight, and in particular the kinetic energy, of the door leaf and of the terminating profile, there is, apart from the switching deceleration, a relatively long follow-on travel so that high, and thus expensive, safety strips have to be used.

A further disadvantage of such safety strips comprising profiled elastomeric material is the fact that, in addition to the unavoidable activation force and the resistance force resulting from its deformation, switching decelerations, or even switching failures, may occur depending on the direction of impact.

Owing to these problems, the procedure of arranging photoelectric barrier arrangements at a distance corresponding at least to the follow-on travel of the door leaf, in front of the leading edge of the terminating profile of the leaf door, so that the movement of the door leaf is stopped if an obstacle interrupts the light beam of the photoelectric barrier arrangement. Since the light beam runs at a distance in front of the terminating profile of the door leaf, it is ensured that the terminating profile does not come into contact with an obstacle which interrupts the light beam.

Examples of this are given in the documents EP-B-0325602 and EP-B-0284066. EP-B-0325602 discloses a safety device for rolling shutter doors in which the switching device is composed of a photoelectric barrier whose transmitter and pickup elements are arranged on each side of the terminating profile underneath said profile on supporting arms, at a distance corresponding to the braking distance. The supporting arms are guided in a sliding fashion in respective securing elements which are connected to a lower part of the door leaf. If the supporting arm strikes against the ground or a stop, the transmitter and pickup elements are displaced relative to the door leaf and toward it and arrive, at the end of the closing movement of the door, at a position which lies at least at the level of the lower terminating edge of the door leaf.

EP-B-0284066 discloses a high-speed door with a switching device which is provided in the region of the lower edge of the terminating profile and allows the brake to engage when said switching device is activated. The switching device is composed of a photoelectric barrier whose transmitter and sensor element are arranged on each side of the terminating profile at a distance below it corresponding to the braking distance, in the region of the lower ends of plungers which are guided so as to be capable of insertion in guides on the terminating profile or lateral blade-like projections. When the plungers strike the ground or a stop, the plungers dip into the guides so that the terminating profile can be supported on the ground.

In the two examples mentioned above, the transmitter and sensor element are arranged on part of the door leaf, with the result that the transmitter and sensor elements are moved with the door leaf. Owing to this movement, the electrical leads and other components of the electric circuit which extend between the door leaf and frame are subject to strong dynamic loads which are caused by vibrations in the door leaf and continuous bending stresses. In addition, dirt, dust and water may become deposited on various electrical system components and lead to a decrease in the performance or a malfunction of the system. In many cases, the fact that the electrical supply of the sensor and transmitter element has to be led through the door, so that the design of the door or of the door segments has to be adapted to this, proves problematic in these known systems. This adversely affects the flexibility of the user, but also of the manufacturer, as far as the design of the system to be monitored is concerned.

Photoelectric area sensor systems are also known for protecting doors, said sensors being mounted either on one side of the door leaf or else, in order to improve the protection, on both sides of the door leaf. In the first case, adequate protection of persons and property is not provided on the side of the door leaf which is not equipped with the area sensor. In the latter case, the expenditure is too high and the photoelectric area sensor system is too expensive. In addition, it is a common feature of both systems that they are susceptible to incorrect switching if, for example, power supply components such as, for example, power cables, dip into the beam path of the photoelectric area sensor in an uncontrolled fashion due to external weather influences.

All the known safety devices described above have in common that they either have an excessively restrictive influence on the design possibilities of the system to be monitored or else result in the control device for the overall system to be monitored being relatively complex.

SUMMARY OF THE INVENTION

The object of the present invention is therefore to provide a safety device for motor-operated systems of the generic type which, with simple mounting technology, provides a maximum degree of safety for, on the one hand, any system component to be monitored and, on the other hand, for operators, and which requires only low expenditure on control equipment.

This object is achieved by providing a safety device for externally operated systems for protecting the movement of a system component against undesired collision with an object lying in the movement path of the system component, the system component to be monitored being capable of being moved in a guided fashion along a predetermined path (door plane ET), having a preferably optical beam protection, preferably on the basis of infrared beams, which monitors the movement path of a leading edge of the system component and which has at least two, preferably at least three or a plurality of preferably parallel beams which are arranged staggered in the direction of movement of the system component and which are emitted on one side of the system component and received or reflected on the other side, and with a safety circuit with which the movement of the system component is stopped or reserved if an obstacle is sensed in the movement path of the system component, wherein the beam protection is arranged in such a way that the beam area which is defined by the beams has at least one line in common with the movement area through which the leading edge passes, and in that the safety device which operates autonomously has a beam-state control device which assigns various activation states to the beams as a function of the position and the movement of the system component.

According to the invention, a safety device which operates autonomously is provided, the beam-state control device of which operates in such a way that, once the position of the system component (initialization phase) has been determined, a predetermined activation algorithm for the beam protection, for example in the form of individual photoelectric barrier systems, can run automatically. The algorithm according to the invention makes it possible to position the beams in the movement path of the system component, with the result that a single photoelectric area sensor system is sufficient to monitor the entire movement path of the system component, as a result of which the expenditure on technical equipment is further reduced. Because the actual position of the system component determines the various activation states of the photoelectric barriers, the safety device is synchronized automatically with the movement of the door. It is no longer necessary to connect the control system of the system component to be monitored, with the result that the safety device according to the invention can be retrofitted as, as it were, a "stand-alone solution" for a wide variety of moving systems. In addition, the control circuit which is necessary is simple and complex interfaces for controlling the system to be monitored may be dispensed with. The safety device according to the invention provides an unprecedented level of monitoring safety. Since any object which is in contact with the monitored moving face of the system component, such as for example of a door, of a car window or of a machine tool component, inevitably causes the safety device to respond and immediately prevents activation of the drive unit for the system component to be monitored. Possible control errors, but also movement deviations owing to inertia (running-on of relatively large moving masses) are thus compensated from the outset.

The safety device according to the invention can thus be used on an individual basis. It can also be combined with any moving system components such as, for example, driven motor vehicle windows, cabin doors, tool carriages etc. in a simple way without their respective drive controller of the system component having to be modified.

The beam area of the system component may be a plane, in which case commercially available photo electric barroer strips may be used.

Maximum safety is achieved wherein the beam area coincides with the movement area because both lateral guides are thus also completely protected against unintentional intervention in it. In addition, this simultaneously provides shielding even of sensitive photoelectric strips.

Basically, to implement the solution principle according to the invention it is sufficient to implement a single pair of beams. The sensitivity of the safety device can be increased as desired and the beam protection may be performed by a photoelectric photo sensor.

The optimum algorithm for determining the activation states of the individual beams is one wherein a device for determining the position of the leading edge of the system component is provided, and wherein the beam-state control device is designed in such a way that at least the beam which is nearest to the leading edge and is not covered by the system component (door 12) is assigned an inactive transition state (ZERO) between an active state (1) and a passive state (X). Then, as the motordriven system crosses, during its movement, the at least one beam which is in the transition state (ZERO), the next beam in the direction of movement is changed from the active state (1) to the transition state (ZERO). This algorithm enables the beams through which the leading edge of the system component (door) successively passes to be placed sequentially and automatically in a passive state X, an inactive state 0 and an active state 1. These states are passed through sequentially with the movement of the leading edge.

When the number of beams set to the transition state zero can be changed with the speed of movement of the system component, it is possible, when required, to perform adaptation to the movement speed of the door in order to allow for the mass inertia of the door.

By providing a safety device as described above, wherein when the beam is interrupted by the closing edge and is in the transition state Zero the next beam which is nearest in the direction of the closing movement of the system component and is in the active state is set to transition state (ZERO) and/or wherein the beams which are in the passive state (X) are sequentially switched into the active state (1) during the backward movement of the system component, an advantageous signal flow in the system and to a continuous maximum safety state of the beams are provided, even if the system component is moved back only in certain areas and then again assumes the direction of movement to be monitored.

If the safety device is one wherein a memory device is provided in which the activation states of at least two adjacent beams are continuously buffered in order to determine the direction of movement of the motor-operated system from the change in the activation states is provided, the safety device may simultaneously be used as a detector device for determining the position and the direction of movement of the system component (door).

By providing a safety device, wherein the photoelectric area has a starting beam which, in a home position of the system in which the leading edge is located outside the photoelectric area sensor, assumed the transition state (ZERO), it being the case that preferably the starting beam is sensed automatically and determined in the event the system component (door leaf) is located within the photoelectric area sensor when the safety device is switched on, the maximum area taken up by the safety device is reduced to reasonable dimensions which are dependent on the respective circumstances. The expenditure on examining the position, and thus on the safety device, is thus further reduced.

By providing a device wherein the distance of the beams from one another decreases in the systems direction of movement to be monitored and /or by providing a photoelectric area sensor that is actuated at least in certain areas in such a way that a transmitter beam is evaluated by at least two receivers (cross beam technology), enable the sensitivity of the safety device to be kept particularly high wherever specific hazard scenarios occur, such as for example in the case of rolling shutter doors at a low height above the ground, at which level flat extension arms of forklift trucks move. The cross-beam technology permits simpler and more cost-effective photoelectric strips to be used.

The safety device is not restricted to any orientation of the movement of the system components.

If the strips of the protective photoelectric area sensor are arranged on the guides, the area covered by the photoelectric area sensor approximates so closely to the area of movement that sufficient safety is already provided for a large part of the instances of use.

A maximum degree of safety is obtained by integrating the bars of the beam projection which is designated as a photoelectric area sensor into the guide profile, with the particular advantage of the easy retrofitability into existing guide systems.

BRIEF DESCRIPTION OF THE DRAWINGS

Further features and advantages of the present invention are apparent from the description below of preferred embodiments of the present invention with reference to the appended drawing, in which.

DETAILED DESCRIPTION OF THE INVENTION

Figure 1:
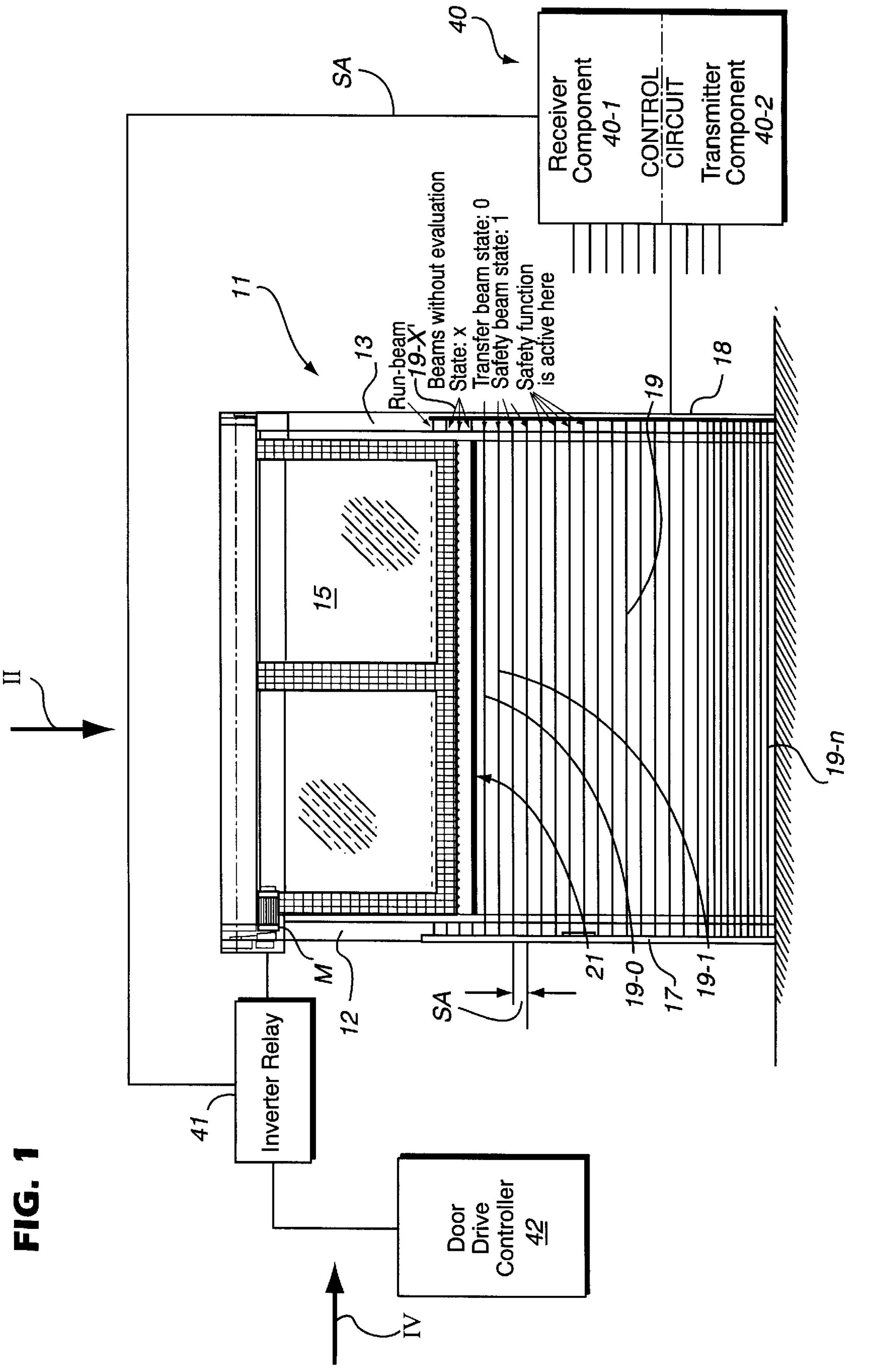
FIG. 1 shows a partially sectional front view of a rolling shutter door for which the safety device according to the invention is provided.
Figure 2:
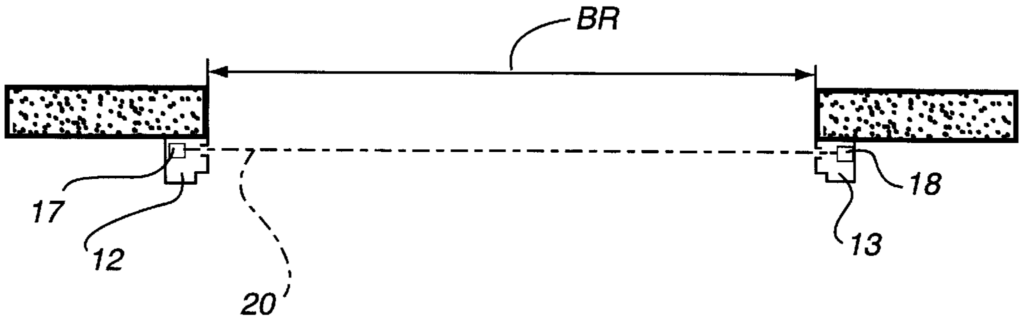
FIG. 2 shows the view according to "II" in FIG. 1.
Figure 3:
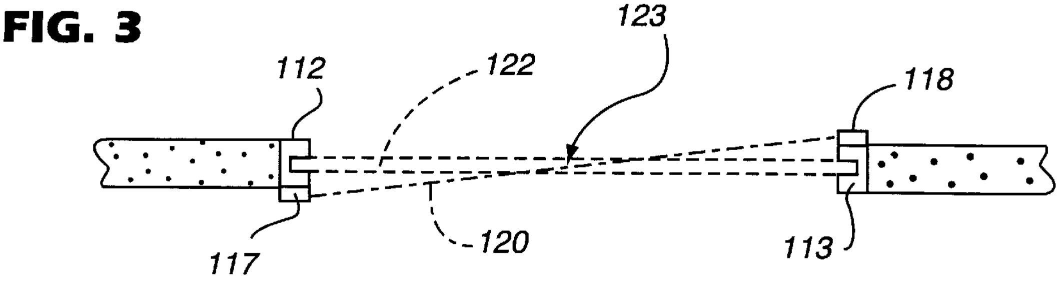
FIG. 3 shows a view, similar to that in FIG. 2, of a variant.
Figure 4:
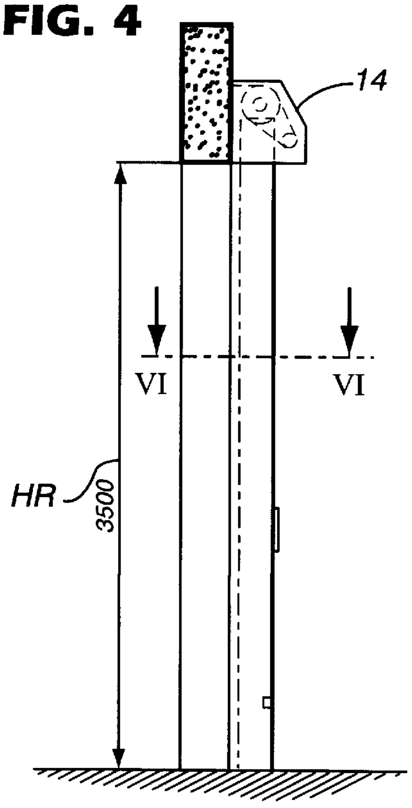
FIG. 4 shows a side view according to "IV" in FIG. 1.

In the description of the figures, those components which correspond to one another are provided with similar reference symbols, in front of which there is merely a different ordinal number. Firstly, a first application area of the safety device for moving doors will be described below with reference to FIGS. 1 to 10.

A rolling shutter door 11 of the width BR and height HR is composed, in a known manner essentially of two laterally arranged hollow guide profiles 12 and 13 with U-shaped cross sections, a cross member 14 which rests on the lateral guide profiles and in which a motor and a winding shaft which is driven by the motor are accommodated, and a flexible door leaf 15 which is guided in vertically extending slit-like guides in the lateral guide profiles 12 and 13 and is wound onto the winding shaft.

Since the rolling shutter door for which the safety device according to the invention is used corresponds to a generally known rolling shutter door, a more precise description of the rest of its design will not be given here.

A safety device which is independent of the door controller, i.e. operates autonomously and is preferably optical, is assigned to the rolling shutter door 11. For this purpose, on each side of the door leaf 15 there is a strip 17, 18 of a photoelectric area sensor arrangement, for example on the basis on infrared beams, one strip accommodating the photoelectric transmitter and the other strip the photoelectric receiver so that a plurality of one-way photoelectric barriers with the beams 19-1 to 19-n are formed.

In the embodiment shown, each transmitter is assigned a receiver. In addition, the beams run parallel to one another. However, this is not absolutely necessary. A transmitter may be assigned a plurality of receivers. In addition, the beams 19 may also run obliquely.

The strips 17, 18 are attached in such a way that the area 20 covered by the light beams 19 has at least one line 123 (FIG. 3) in common with the area 122 of movement (FIG. 3) which the leading door edge 21 of the door leaf 15 passes through. In the embodiment according to FIGS. 1, 2, 4 and 5, the planes coincide, i.e. the photoelectric area sensor lies directly in the closing plane of the door leaf.

All the embodiments have in common that the strips 17, 18 117, 118 are attached to the guide rails 12, 13 and 112, 113. According to FIGS. 2, 4 and 5, they are arranged inside the guide rail and/or the guide profiles 12, 13; in the embodiment according to FIG. 3 they are attached to the side of the profiles 112, 113, specifically to different sides of the door leaf.

Figure 5:
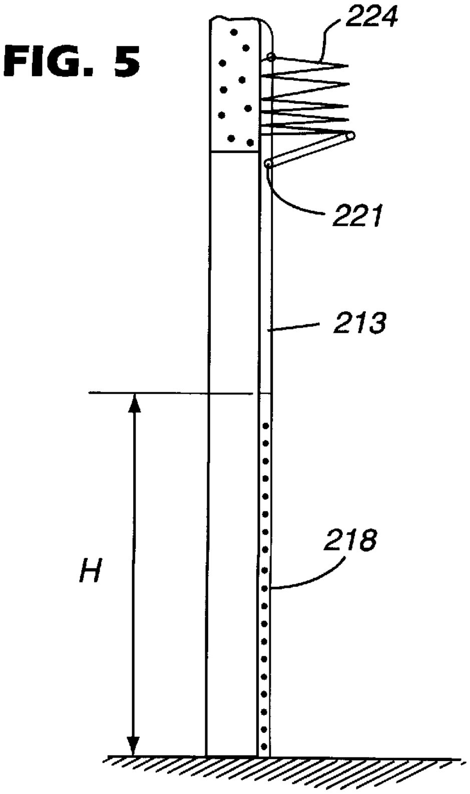
FIG. 5 shows a view, similar to FIG. 4, of a variant of the door.

The photoelectric barrier arrangement is used to monitor the closing movement of the door in order to exclude the possibility of the leading edge of the door striking an obstacle. FIG. 5 shows that the height H to be monitored may be appropriately limited to a reasonable dimension, for example to 2500 mm. The figure also shows that the door leaf may be of any desired shape, for example may be formed of folded segments 224. The leading edge 221 is in turn guided in a guide profile 213 in which the photoelectric strip 218 may also be accommodated.

Figure 6:
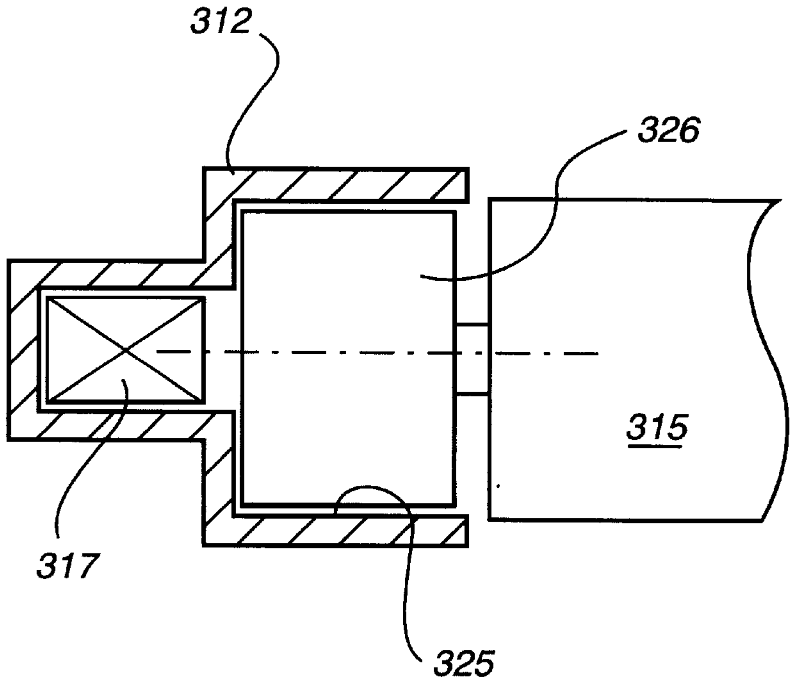
FIG. 6 shows section "VI—VI" in FIG. 4.
Figure 7:
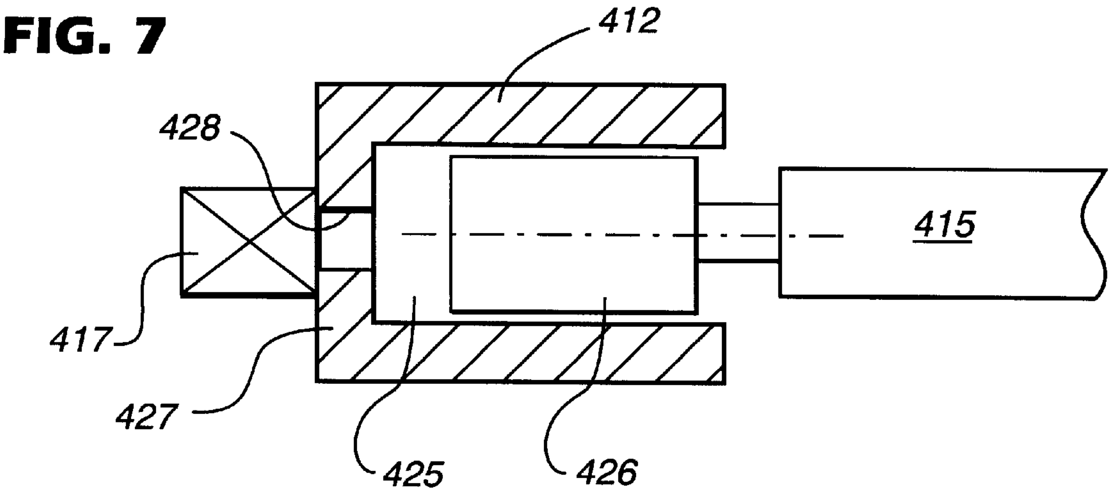
FIG. 7 shows a section, corresponding to FIG. 6, of a variant of the guide profile.

FIGS. 6 and 7 show variants of the arrangement of the photoelectric strips in or on the respective guide profile:

According to FIG. 6, the guide profile 312 is provided with a further profiled chamber which is adapted to the photoelectric strip 317 and adjoins the guide chamber 325 for a roller 326 of the door leaf 315. The gate is retrofitted here with the safety device according to the invention by exchanging the guide profile.

According to FIG. 7, the guide profile 412 can remain essentially unchanged when retrofitting is carried out. Here, the web 427 of the guide profile 412 contains a series of bore holes 428 in a pattern of holes corresponding to the photoelectric barrier arrangement. The bars 417 are attached to the outside of the web 427.

So that the beams of the photoelectric barrier arrangement which lead from the transmitter to the receiver can run in the area of movement of the leading edge 21 of the door, the safety device has a specific control circuit with which the beams are sequentially assigned period activation states as a function of the position and the movement of the door leaf. This will be explained in more detail below:

In each case that beam 19-0 which is nearest to the leading edge 21 when the door closes receives the activation state ZERO from the control circuit 40, i.e. if the edge 21 passes through this light beam shortly afterwards this photoelectric barrier does not emit a signal which interrupts the closing movement of the door leaf.

All the beams 19-x which lie behind the beam 19-0 in the direction of movement and have already been covered by the door leaf assume the inactive state X.

On the other hand, the beams 19-1 to 19-n are in the active state 1, i.e. each obstacle in the region of the beams 19-1 to 19-n ultimately supplies an output signal SA which is applied to an interrupter or inverter relay 41 in order to interrupt or reverse the drive of the motor. It is clear from the illustration according to FIG. 1 that the controller 42 of the door drive is thus detached from the safety device 40, i.e. that both devices 40, 42 operate independently of one another.

When the door leaf reaches the beam 19-0, the control circuit ensures that the beam 19-0 becomes the passive beam 19-x, while the beam 19-1 becomes the new beam 19-0. Thus, when the door leaf closes, all the beams change sequentially from the active state 1 into the transition state ZERO and finally into the passive state x, specifically controlled automatically by the movement of the door leaf. An exception to this is formed by the top beam 19-* which begins with the transition state ZERO. The safety device serves simultaneously as a device for determining the position of the door leaf. For this purpose, preferably when the door is opened, the released beams are sequentially changed into the active state 1 via the transition state ZERO.

Figure 8:
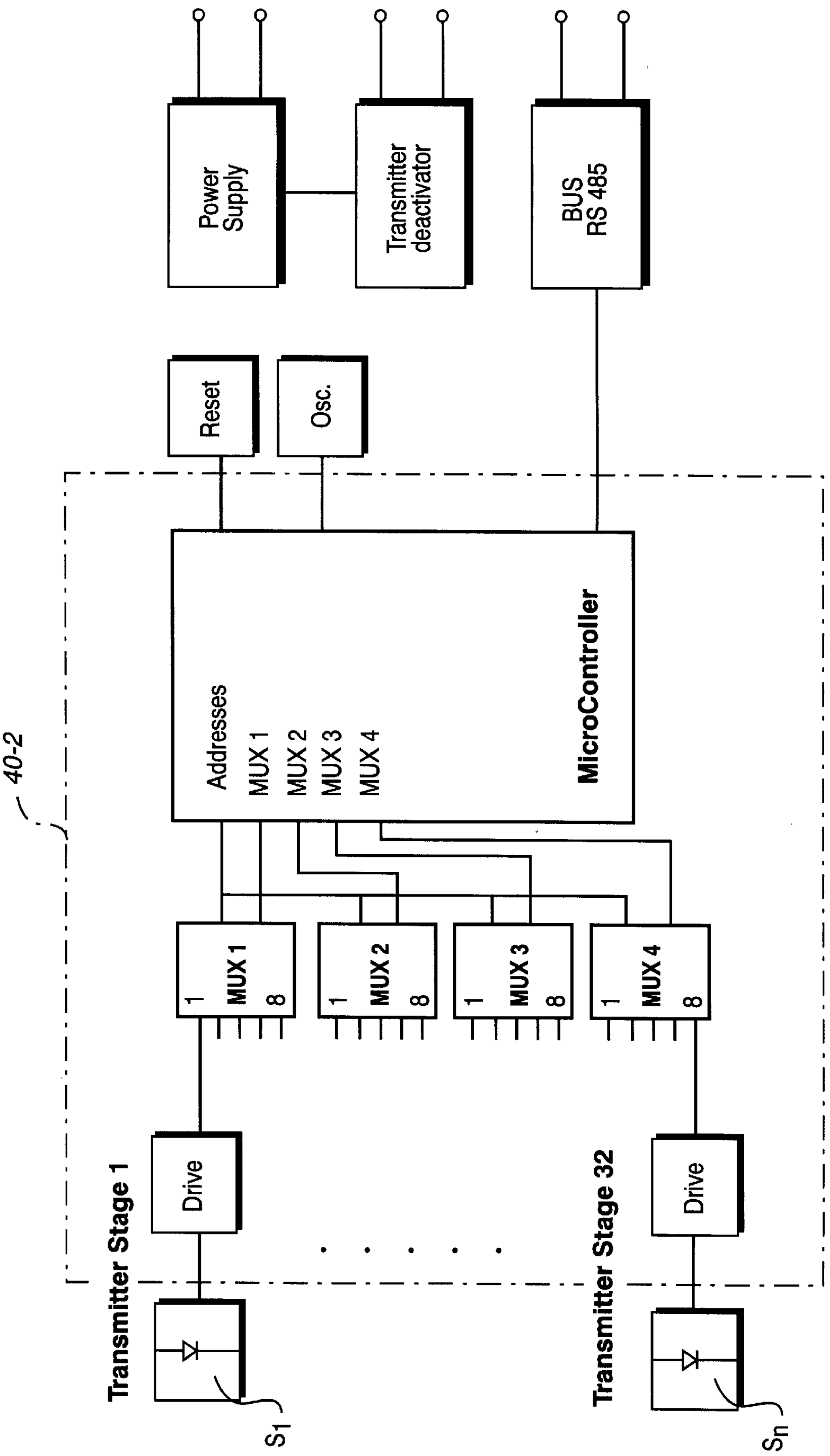
FIG. 8 and FIG. 9 show block circuit diagrams of the actuation and evaluation device of the safety device.
Figure 9:
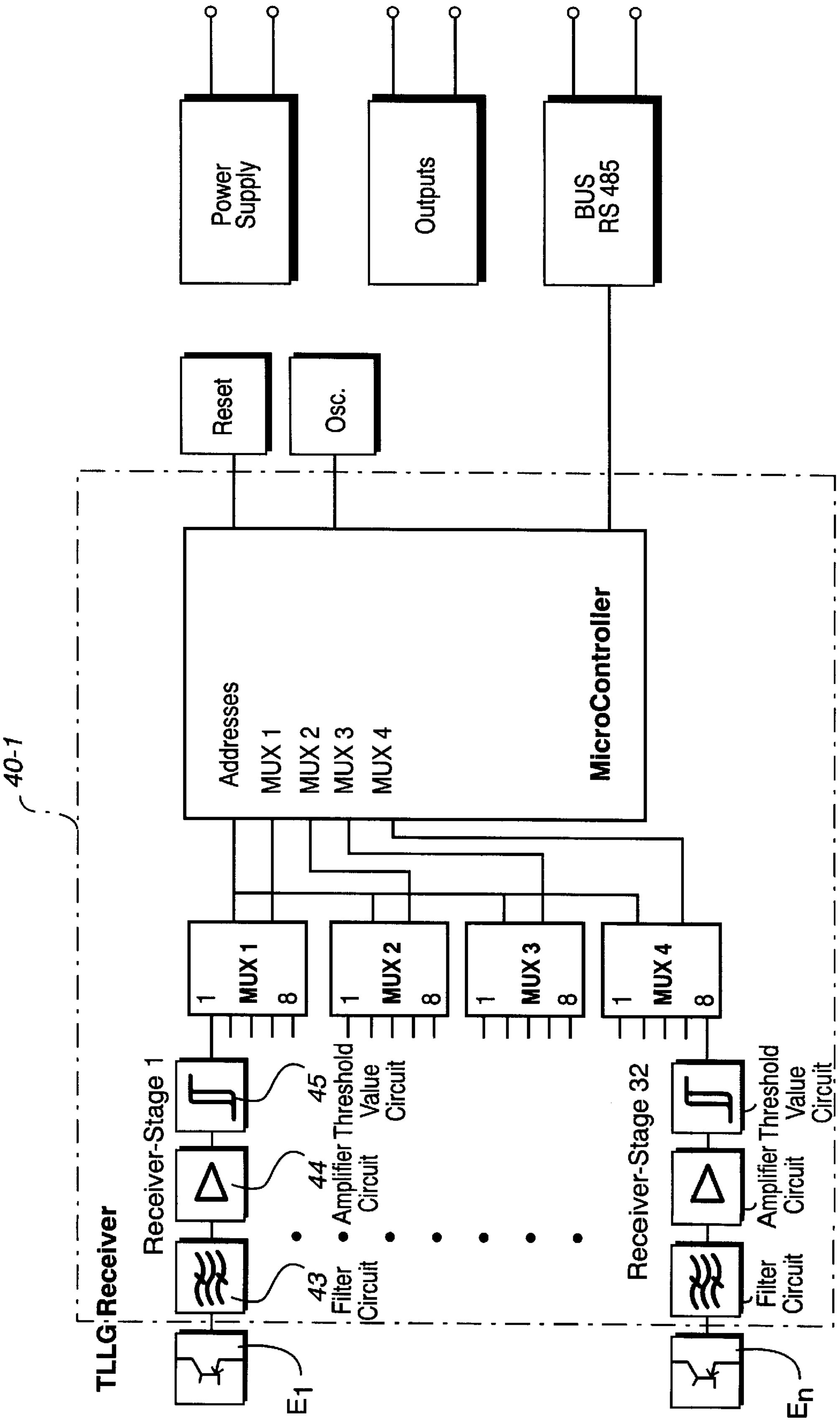

FIG. 8 and 9 show a possible embodiment for the actuation of the photoelectric area sensor and the evaluation of the signals present at the individual photoelectric barriers. FIG. 8 shows the transmitter component 40-2, and FIG. 9 shows the associated receiver component 40-1.

The individual sensors S1 to Sn, for example in the form of light emitting diodes, and the receivers E1 to En in the form of phototransistors, i.e. the photoelectric barriers, can be addressed and evaluated individually by means of a multiplexer arrangement MUX1 to MUX4 which is known per se. That is to say the individual transmitters, such as for example light emitting diodes, can be switched on and off selectively and individually under the control of the microcontroller.

On the other hand, at the receiver end the signals which are received by the receiver, such as for example by the phototransistors, can be evaluated individually and selectively by means of the receiver-end microcontroller. For this purpose, filter circuits (43), amplifier circuits (44) and threshold value circuits 45 (Schmitt trigger) can be used to eliminate interference influences.

This arrangement can also be used to gate out selectively determined photoelectric barriers on an individual basis in order to represent, for example, a brief entrance via a threshold ramp or else the presence of a momentarily high coverage of snow.

Figure 10:
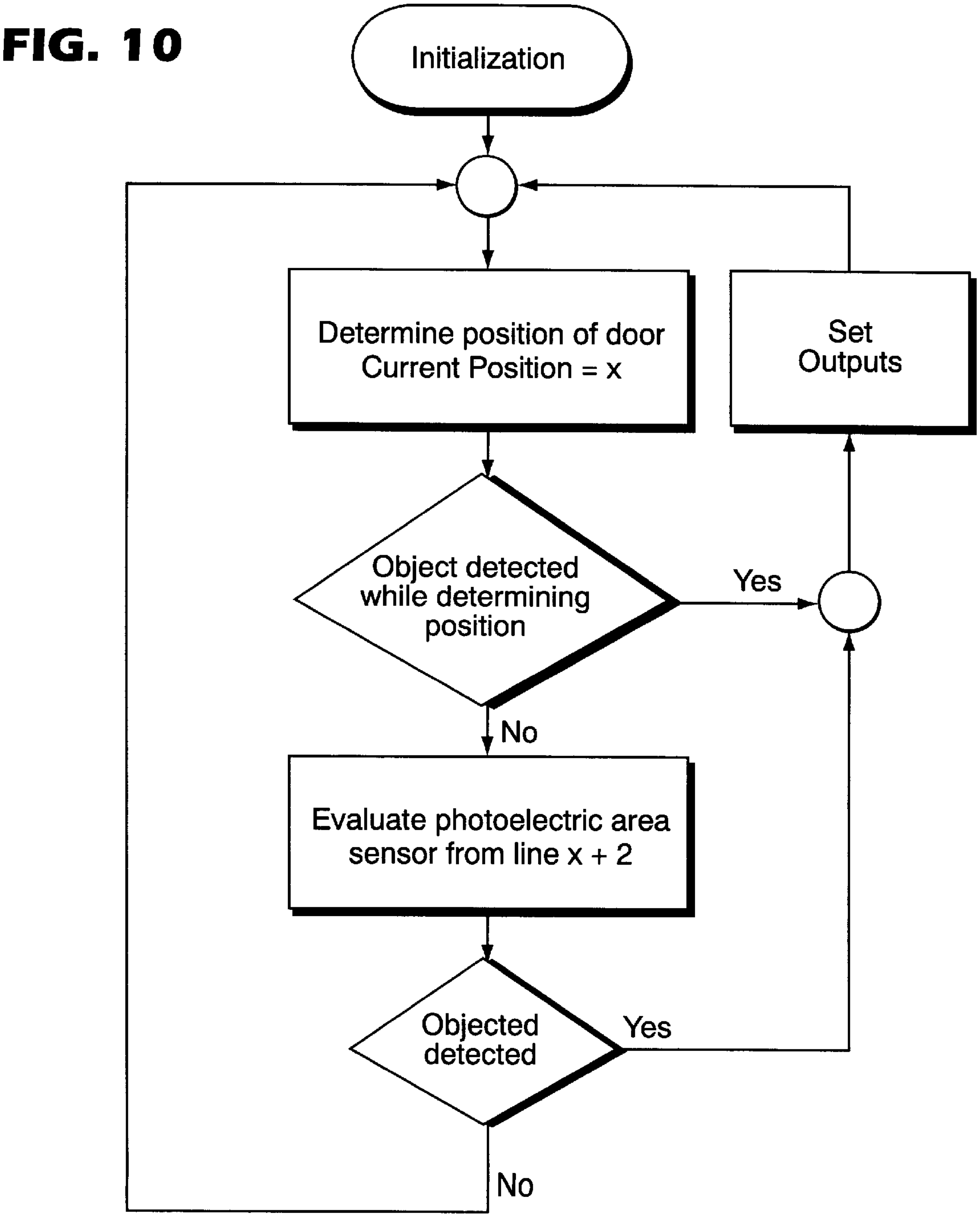
FIG. 10 shows a flowchart for explaining the mode of operation of the safety device.

Finally, the program sequence on which the safety device is based will be explained with reference to FIG. 10:

The system is initialized in step 1. The position of the leading edge of the door is determined, it being already possible at this point to access again the signals present at the individual addresses. The current position of the edge of the door will be assumed to be the x-th address, i.e. the x-th beam.

If an object is detected during the determination of the position, the control circuit emits an output signal SA, i.e. the outputs are set.

Otherwise, the photoelectric area sensor is evaluated starting from the position x+2, i.e. the address x+1 is given the state ZERO and all the beams x+2 to x+n are active.

If an obstacle is then sensed, the outputs are set. Otherwise, the routine starts again.

Figure 11:
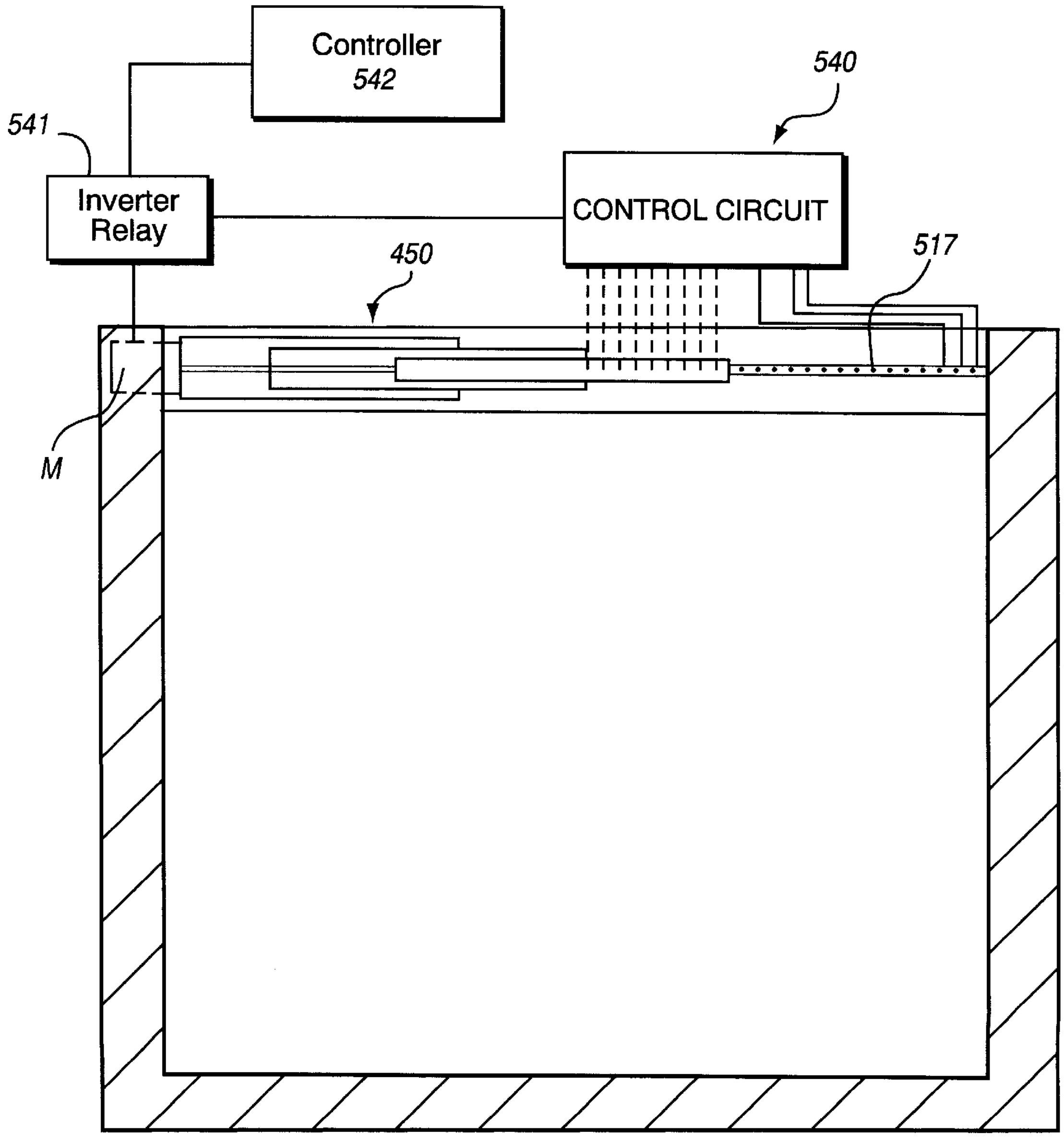
FIG. 11 shows a schematic side view of a elevator cabin whose door is monitored by the safety device.
Figure 12:
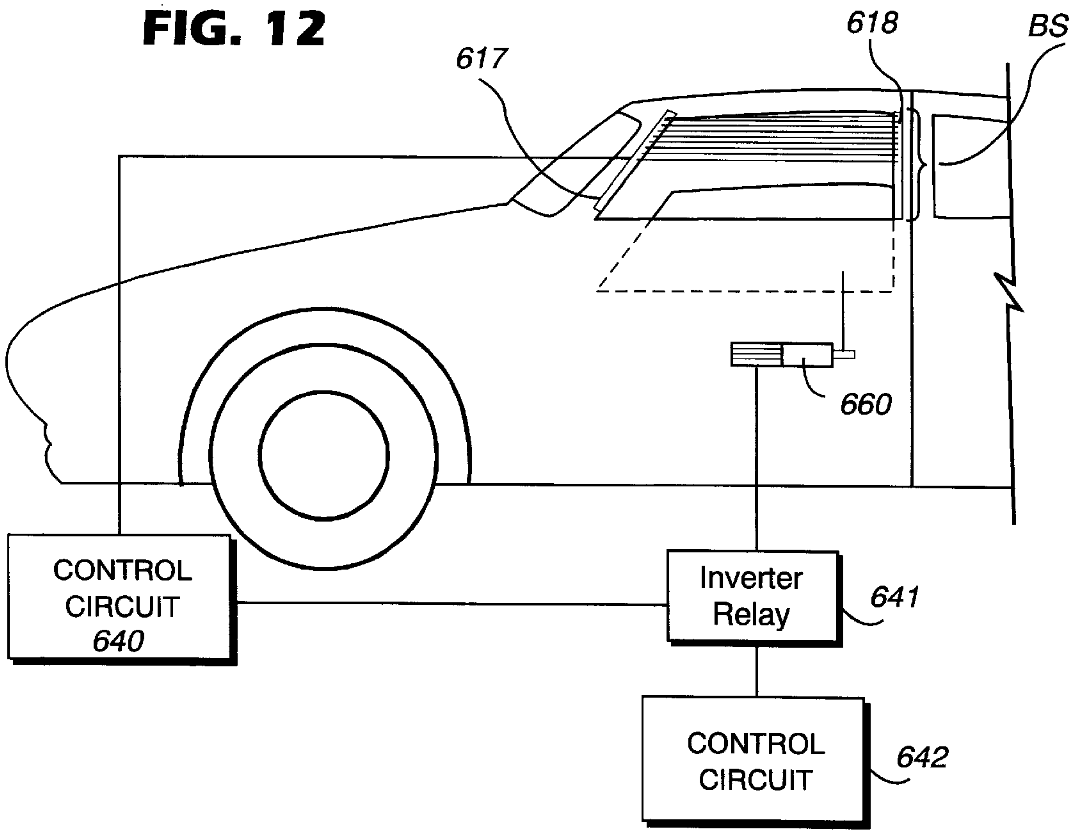
FIG. 12 shows a schematic partial view of a motor vehicle window whose closing movement is monitored by the safety device.
Figure 13:
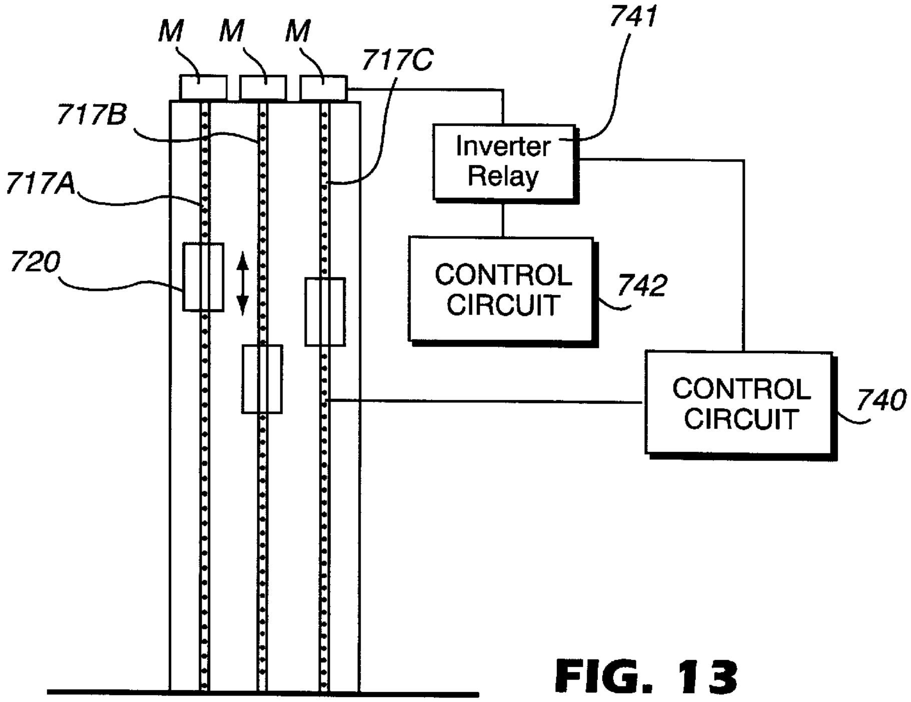
FIG. 13 shows a schematic view of a elevator arrangement on a building with associated safety device.

FIGS. 11 to 13 show further exemplary areas of application of the safety device:

According to FIG. 11, the safety device is assigned to a cabin door 450 which closes horizontally. A photoelectric strip 517 is let into the floor and has a complementary ceiling strip (not shown). The door 450 is driven by a motor M which has a controller 542.

The beams of the photoelectric strip can in turn be driven and evaluated individually by means of the control circuit 540.

A further advantageous application example is shown in FIG. 12. Here, photoelectric strips 617, 618 are arranged on the door frame of a motor vehicle, preferably in the critical closing region BS, so that complete personal protection is provided against the possibility of body parts becoming trapped. Again, the control circuit 642 of the window drive 660 remains unaffected by the safety device. The mode of operation of the control circuit 640 corresponds to the examples described above.

It is clear from FIG. 12 that the photoelectric strips can easily be adapted to the conditions of the system (space, size, orientation).

Finally, FIG. 13 shows an exemplary embodiment of the monitoring of the movement of elevator cabins 770 which move up and down vertically. Once more, photoelectric strips 717A, 717B and 717C are mounted in the plane of movement of the cabins.

The particular feature of this variant consists in the fact that the circuit 740 is designed or programmed in such a way that only those beams which are covered by the cabin 770 have the activation state X, and the beam which is nearest in the momentary direction of movement assumes the state ZERO and all the other beams assume the state 1.

Of course, deviations from the previously described embodiments are possible without departing from the basic idea of the invention. Thus, the beam protection is not necessarily restricted to light beams. It is also possible for transmitters and receivers to be assigned to a single guide rail, so that a reflective photoelectric barrier is used. It is also possible to operate with a series of reflective light sensors.

In the illustrated exemplary embodiments, the light source may be, for example, a conventional light bulb, a light emitting diode or a laser. The light receiver unit can be a photoelectric receiver such as, for example, a photoelectric cell, a photoresistor, a photoelement or a photodiode.

Thus the invention provides a safety device for externally operated systems, in order to protect the movement of a system component against undesired collision with an object lying in the movement path of the system component, the system component to be monitored being capable of being moved in a guided fashion along a predetermined path (door plane ET), having a preferably optical beam protection, preferably on the basis of infrared beams, which monitors the movement path of a leading edge of the system component and which has at least two, preferably at least three or a plurality of preferably parallel beams which are arranged staggered in the direction of movement of the system component and which are emitted on one side of the system component and are received or reflected on the other side, and with a safety circuit with which the movement of the system component is stopped or reversed if an obstacle is sensed in the movement path of the system component, defined by the fact that the beam protection is arranged in such a way that the beam area (E) which is defined by the beams has at least one line in common with the movement area through which the leading edge passes, and in that the safety device which operates autonomously has a beam-state control device which assigns various activation states (X, ZERO, 1) to the beams as a function of the position and the movement of the system component.

Key to figures

FIG. 1

1=RUN beam

2=beams without evaluation State: x

3=transfer beam state: 0

4=Safety beams state: 1

5=Safety function is active here

FIG. 2

FIG. 4

FIG. 8

1=Transmitter stage 1

2=Drive

3=Transmitter stage 32

4=Addresses

5=Power supply

6=Transmitter deactivator

FIG. 9

1=Receiver

2=Receiver stage 1

3=Receiver stage 32

4=Addresses

5=Power supply

6=Outputs

FIG. 10

1=initialization

2=set outputs

3=determine position of door current position=x

4=object detected while determining position

5=no

6=yes

7=evaluate photoelectric area sensor from line x+2

8=object detected

What is claimed is:

1. A method for controlling the movement of a system component along a predetermined movement path defined by a component frame using an autonomous monitoring device that detects a position of said component and detects foreign objects in the movement path of the component to avoid an undesired collision, said monitoring device emitting a plurality of beams from transmitters to receivers, each beam being transmitted from a respective transmitter towards a respective receiver, the method including the steps of:

arranging said transmitters and said respective receivers with respect to said system component frame so that the beams transmitted therebetween travel across or traverse the movement path of the system component to define a monitoring field;

detecting the moving system component in the monitoring field according to the interruption of beams by said system component;

assigning a status to each said beam according to whether said system component has interrupted the beam as the system component moves along the movement path, the portion of the monitoring field defined at least by the beams interrupted by said system component being a non-monitored partial region of the monitoring field and a remaining portion of the monitoring field having beams that have not been interrupted by said system component defining a monitored partial region;

monitoring said monitored partial region of the monitoring field toward which the system component is moving, but into which the system component has not yet passed, to detect a foreign object in the movement path of the system component to avoid an undesired collision; and stopping or reversing the movement of the system component if a beam in the monitored partial region of the scanning field is interrupted.

2. The method according to claim 1, further comprising the step of determining the position of the system component on the basis of one or more detection signals obtained in the detecting step in order to determine the monitored partial region of the monitoring field.

3. The method according to claim 1, wherein the assigning step comprises assigning one of a plurality of activation states to the transmitters and receivers of the monitoring device on the basis of the one or more detection signals obtained in the detecting step.

4. The method according to claim 3, wherein the step of assigning includes the step of assigning a passive state (X) to those transmitters, receivers or pairs thereof, the beams of which the system component has interupted.

5. The method according to claim 3, wherein the step of assigning includes the step of assigning a transition state (ZERO) to the transmitter, receiver or pair thereof of which the corresponding beam will be crossed next during the movement of the system component along the movement path.

6. An autonomous safety device for externally operated systems for protecting a moving system component against undesired collision with an object lying in the movement path of the system component, the system component to be monitored selectively moving along a predetermined movement path defined by a system component frame, the device including:

a plurality of transmitters and receivers for transmitting a plurality of beams from said transmitters to said receivers, said beam being transmitted from respective transmitters towards respective receivers, said transmitters and said respective receivers being located at, and with respect to said component frame so that the beams transmitted therebetween travel across or traverse the movement path of the system component to define a monitoring field in such a manner that, during movement of said moving system component, said beams are successively interrupted and successively released, respectively, one after the other, by said moving system component; and a safety circuit for stopping or reversing the movement of the system component solely upon interruption of a beam in a part of the movement path of the system component into or through which the system component has not yet passed, by an object other than said system component.

7. A safety device as is claimed in claim 6, wherein the plurality of transmitters and receivers comprise a photoelectric area sensor.

8. The safety device as claimed in claim 6, further comprising a beam state control device which assigns one of plurality of activation states (X, ZERO, 1) to the beams as a function of the position and the movement of the system component, and wherein the beam-state control device assigns at least the beam which is nearest to the leading edge but is not interrupted by the system component an inactive transition state (ZERO) between an active state (1) and a passive state (X).

9. The safety device as claimed in claim 8, wherein a circuit is provided which, as the system component interrupts, during its movement, the at least one beam which is in the transition state (ZERO), changes the next beam in the direction of movement of the system component film the active state (1) to the transition state (ZERO).

10. An autonomous safety device for externally operated systems for protecting a moving system component against undesired collision with an object lying in the movement path of the system component, the system component to be monitored selectively moving along a predetermined movement path defined by a system component frame, the device including:

a plurality of transmitters and receivers for transmitting a plurality of beams from said transmitters to said receivers, each beam being transmitted from a respective transmitters towards a respective receivers, said transmitters and said respective receivers being arranged with respect to said component frame so that the beams transmitted therebetween travel across or traverse the movement path of the system component to define a monitoring field;

a safety circuit for stopping or reversing the movement of the system component solely upon interruption of a beam in a part of the movement path of the system component into or through which the system component has not yet passed, by an object other than said system component; and a beam state control device which assigns one of plurality of activation states (X, ZERO, 1) to the beams as a function of the position and the movement of the system component, and wherein the beam-state control device assigns at least the beam which is nearest to the leading edge but is not interrupted by the system component an inactive transition state (ZERO) between an active state (1) and a passive state (X).

11. The safety device as claimed in claim 10, wherein a circuit is provided which, as the system component interrupts, during its movement, the at least one beam which is in the transition state (ZERO), changes the next beam in the direction of movement of the system component from the active state (1) to the transition state (ZERO).

* * * * *